UNITED STATES PATENT OFFICE.

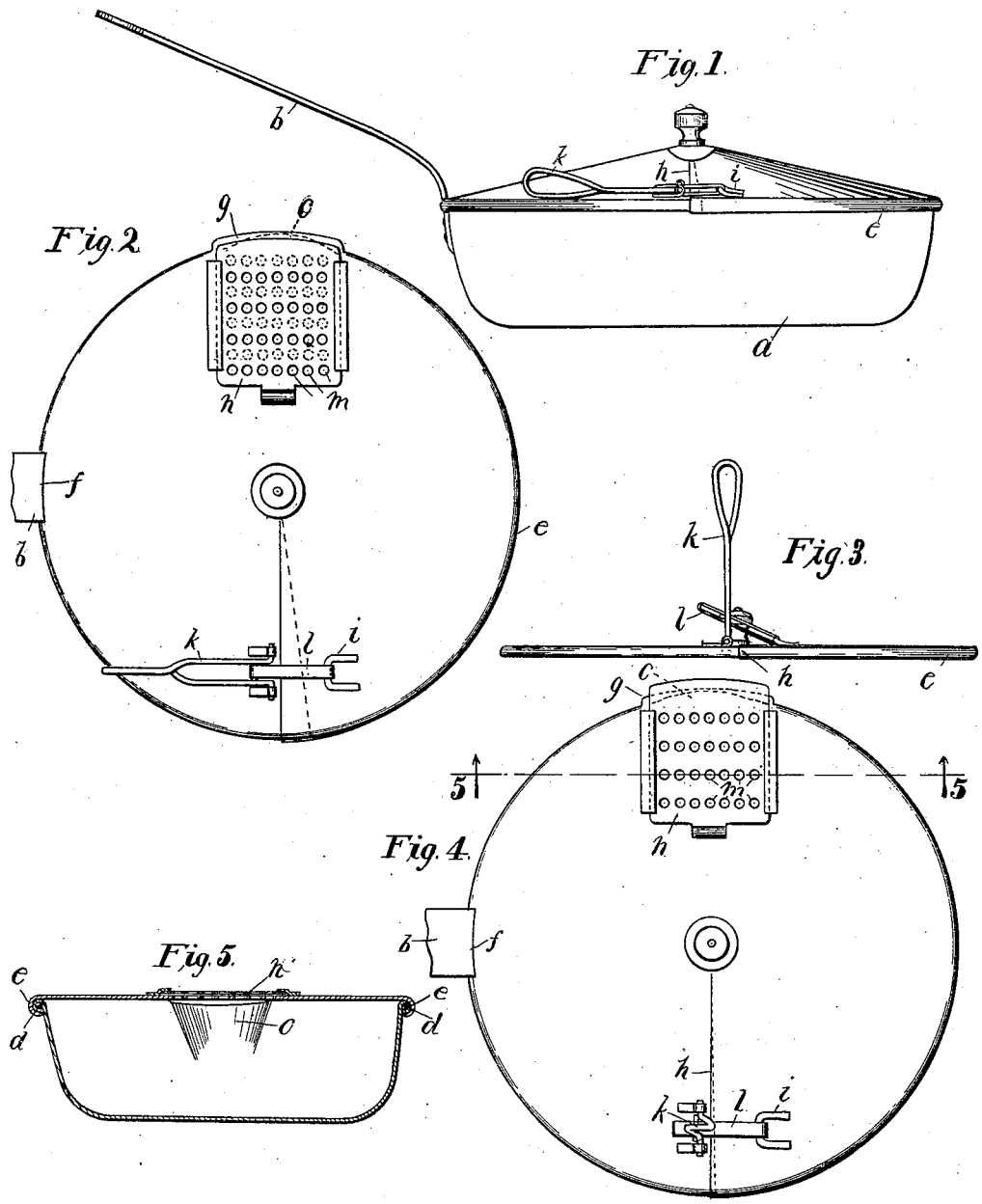

ROBERT H. LITTLE, OF CHICAGO, ILLINOIS.

VESSEL.

No. 860,680.      Specification of Letters Patent.      Patented July 23, 1907.

Application filed September 9, 1905. Serial No. 277,763.

*To all whom it may concern:*

Be it known that I, ROBERT H. LITTLE, a citizen of the United States, residing at Chicago, in the county of Cook and State of Illinois, have invented a certain new and useful Improvement in Vessels, of which the following is a full, clear, concise, and exact description, reference being had to the accompanying drawings, forming a part of this specification.

My invention relates to vessels having displaceable covers, and has for its object the provision of an improved structure of the class described whereby the cover may be readily held upon the vessel.

The invention is of particular utility in connection with kitchen utensils though it need not be limited to this class of receptacles, for it enables the cover to be securely fastened in position so that the vessel may be tilted to permit fluid contained therein to be poured off while the solid contents of the vessel are retained.

In practicing my invention, I provide a cover that is expansible and contractible in size and a self-setting device for determining the contracted and expanded conditions of the cover. The cover is desirably, though not necessarily, provided with a substantially continuous rim or flange which preferably surrounds the rim of the vessel, which cover rim, by reason of the variability in size of the cover, is adapted to clench the vessel to hold the vessel and cover securely together for the purposes specified.

I will explain my invention more fully by reference to the accompanying drawing, showing the preferred embodiment thereof, in which—

Figure 1 is a side elevation of the preferred form of the invention. Fig. 2 is a plan view thereof. Fig. 3 is a view showing the adjusting device in a position permitting the expansion of the cover. Fig. 4 is a plan view of the structure shown in Fig. 3. Fig. 5 is a sectional view on line 5—5 of Fig. 4.

Like parts are indicated by similar characters of reference throughout the different figures.

The vessel $a$ is shown in the form of a stew pan, though it is obvious that the invention is not restricted to this type of vessel. The vessel in this instance is provided with a handle $b$ and a spout or mouth $c$ and also preferably, though not necessarily, has a bead $d$ upon its exterior at the rim to promote the effectiveness of the engagement between the cover and the vessel. The cover is provided with a flange $e$, conforming in shape to the bead, this flange being preferably discontinued at $f$ to accommodate the handle and at $g$ to permit the ready flow of liquid from the vessel. The cover in the form shown, is circular and is slit at $h$ from the center to the rim in a radial direction. A self-setting device coöperates with the portions of the cover that are separated by the slit, so that these portions of the cover may overlap or may recede to fasten the cover in position upon the vessel and to release it from its locking engagement with the vessel. I have shown one form of self-setting device comprising a stationary loop $i$ on one side of the slit, a rotating lever $k$ on the other side of the slit, and a metallic band or connecting link $l$ engaging the loop and lever, the place of connection of the band or link with the lever being eccentric to the axis of rotation of the lever, so that as the lever is swung, the portions of the cover parted by the slit may move toward and from each other. In the construction shown the resiliency of the cover causes these portions thereof to separate when the lever is thrown toward the loop, the lever when thrown away from the loop causing a contraction of the cover.

It will be seen that when the cover is contracted, the locking action thereof upon the rim of the vessel is substantially uniform throughout said rim, so that the vessel is not likely to be thrown out of shape as it might otherwise be were the vessel made of somewhat soft material, as aluminium. The invention need not be limited to this substantially continuous engagement of the cover with the rim of the vessel, particularly where the vessel is made of rigid material.

I preferably, though not necessarily, provide a series of perforations $m$ in the cover so that the liquid may be poured therethrough the more readily while the solids are retained. This perforated portion of the cover acts as a strainer. In order that the vapors within the vessel may largely be retained, a perforated slide $n$ is mounted above the perforations $m$, the perforations in the slide being adapted to overlie the perforations in the cover when the liquid is to be removed, while the solid portions of the slide are adapted to overlie the perforations to prevent material egress of the vapors.

By the expression "self-setting device" as used herein I mean a device which, when brought to its different alternative positions, will afford the expansion and contraction of the lid inherently, whereby the use of clamping screws, etc. is not required.

In the construction shown in United States Patent No. 267,345, issued to Hayden and Arnold November 14, 1882, a slit cover is shown, but it is apparent from an inspection of the drawings of this patent that the cover has no such self-setting device that will readily enable the cover to be expanded and contracted while in place.

I do not wish to be limited to the precise features herein shown, but,

Having thus described my invention, I claim as new and desire to secure by Letters-Patent:

1. The combination with a vessel, of its cover that is substantially circular and having a flanged rim the cover having a slit passing substantially from its center to its rim, whereby the cover is changeable in size, a device for varying the size of the cover to lockingly engage its rim with the vessel or release such engagement, said device having permanent connection with the cover on both sides of the slit and a handle, constituting a lever, acting upon said device and when in one position forcing said cover to change its size, and when in another position permitting the cover to assume its other size.

2. The combination with a vessel, of its cover having a slit whereby the size of the cover may be changed, a device for varying the size of the cover to lockingly engage it with the vessel, and a handle, constituting a lever, acting upon said device, which said device has permanent connection with the cover on both sides of the slit, said handle when in one position causing said device to impart one size to the cover, and in an alternative position to permit said cover to assume another size.

In witness whereof, I hereunto subscribe my name this seventh day of September A. D., 1905.

ROBERT H. LITTLE.

Witnesses:
G. L. CRAGG,
LEON STROH.